(12) United States Patent
Miller et al.

(10) Patent No.: US 11,183,038 B2
(45) Date of Patent: Nov. 23, 2021

(54) DETACHER FOR SELF-DETACHING TAG

(71) Applicant: Sensormatic Electronics, LLC, Boca Raton, FL (US)

(72) Inventors: Channing E. Miller, Fort Lauderdale, FL (US); Adam S. Bergman, Boca Raton, FL (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 0 days.

(21) Appl. No.: 17/037,148

(22) Filed: Sep. 29, 2020

(65) Prior Publication Data

US 2021/0097831 A1    Apr. 1, 2021

Related U.S. Application Data

(60) Provisional application No. 62/908,551, filed on Sep. 30, 2019.

(51) Int. Cl.
*G08B 13/14* (2006.01)
*G08B 13/24* (2006.01)
*G06K 7/10* (2006.01)

(52) U.S. Cl.
CPC ....... *G08B 13/242* (2013.01); *G06K 7/10297* (2013.01); *G08B 13/2417* (2013.01); *G08B 13/2434* (2013.01); *G06K 2007/10504* (2013.01)

(58) Field of Classification Search
CPC .............. G08B 13/242; G08B 13/2417; G08B 13/2434; G06K 7/10297; G06K 2007/10504

USPC .......................... 340/572.1–572.9, 10.1–10.6
See application file for complete search history.

(56) References Cited

U.S. PATENT DOCUMENTS

| | | | | | |
|---|---|---|---|---|---|
| 5,793,290 | A | * | 8/1998 | Eagleson | G08B 13/2454 340/573.4 |
| 5,955,951 | A | * | 9/1999 | Wischerop | E05B 73/0064 340/572.8 |
| 5,995,003 | A | * | 11/1999 | Rogers | G08B 13/1463 340/568.1 |
| 2005/0030182 | A1 | * | 2/2005 | Hogan | E05B 73/0017 340/572.9 |
| 2006/0125643 | A1 | * | 6/2006 | Skjellerup | E05B 73/0017 340/572.9 |

(Continued)

OTHER PUBLICATIONS

International Search Report and Written Opinion issued in corresponding International Application No. PCT/US2020/0554370 dated Jan. 12, 2021.

*Primary Examiner* — Brian A Zimmerman
*Assistant Examiner* — Thang D Tran
(74) *Attorney, Agent, or Firm* — Arent Fox LLP (57) ABSTRACT

An apparatus and method for unlocking a security tag that is connected to an article. The apparatus includes an unlocking device configured to provide an unlock signal or force to a security tag allowing for the security tag to be removed from the article. The apparatus further includes an unlocking surface disposed between the unlocking device and the security tag and an alignment feature configured to indicate a detachment zone that corresponds with a source of the unlock signal or force, wherein placing the tag in the detachment allows for the unlocking device to provide an unlock signal or force to the security device to allow the security tag to be removed from the article.

22 Claims, 7 Drawing Sheets

(56) References Cited

U.S. PATENT DOCUMENTS

| | | | | |
|---|---|---|---|---|
| 2007/0067971 A1* | 3/2007 | Nguyen | ............ | G08B 13/2434 24/704.1 |
| 2007/0273523 A1* | 11/2007 | Skjellerup | ............ | E05B 73/0064 340/572.1 |
| 2008/0218348 A1* | 9/2008 | August | ................ | G06Q 20/203 340/572.1 |
| 2008/0303675 A1* | 12/2008 | Hogan | ................ | E05B 73/0017 340/572.8 |
| 2009/0128341 A1* | 5/2009 | Skjellerup | ............ | E05B 73/0017 340/572.9 |
| 2009/0229327 A1* | 9/2009 | Valade, Jr. | .......... | E05B 73/0052 70/277 |
| 2010/0176951 A1* | 7/2010 | Zinner | ................ | E05B 73/0035 340/572.9 |
| 2012/0206263 A1* | 8/2012 | Yang | ........................ | G08B 3/10 340/572.8 |
| 2012/0256748 A1* | 10/2012 | Russell | ............. | G08B 13/2434 340/572.1 |
| 2013/0036780 A1* | 2/2013 | Valade, Jr. | ......... | G08B 13/2434 70/275 |
| 2013/0141242 A1* | 6/2013 | Ho | .................... | G08B 13/2434 340/572.1 |
| 2013/0321153 A1* | 12/2013 | Yang | .................. | G08B 13/2434 340/572.1 |
| 2014/0208559 A1* | 7/2014 | Stewart | ............... | E05B 73/0052 29/283 |
| 2014/0232530 A1* | 8/2014 | Stewart | ................. | E05B 39/007 340/10.5 |
| 2014/0240129 A1* | 8/2014 | Bergman | ............ | E05B 73/0047 340/572.9 |
| 2015/0002259 A1* | 1/2015 | Favier | ................ | E05B 73/0052 340/5.2 |
| 2015/0061872 A1* | 3/2015 | Chandramowle | ... | E05B 73/0017 340/572.9 |
| 2015/0137977 A1* | 5/2015 | Yang | .................. | G08B 13/2434 340/572.8 |
| 2015/0243145 A1* | 8/2015 | Nguyen | ............. | E05B 73/0052 340/572.8 |
| 2016/0364968 A1* | 12/2016 | Sharpy | ................. | G08B 13/242 |
| 2017/0178479 A1* | 6/2017 | Ellers | .................. | G08B 13/242 |
| 2019/0188982 A1* | 6/2019 | Lavery | ................ | G08B 13/246 |

* cited by examiner

DETACHER FOR SELF-DETACHING TAG

This application claims priority to U.S. Provisional Application No. 62/908,551, titled "Detacher For Self-Detaching Tag," filed on Sep. 30, 2019, the entire contents of which are hereby incorporated by reference herein.

TECHNICAL FIELD

The described aspects relate to a detacher for security tags used in Electronic Article Surveillance ("EAS") systems. More particularity, to tag detachers for removing security tags from articles.

BACKGROUND

An Electronic Article Surveillance ("EAS") system is designed to prevent unauthorized removal of an item from a controlled area. A typical EAS system may comprise a monitoring system and one or more security tags. The monitoring system may create a surveillance zone at an access point for the controlled area. A security tag may be fastened to a monitored item, such as an article of clothing. If the monitored item enters the surveillance zone, an alarm may be triggered indicating unauthorized removal.

The security tag may be fastened to merchandise or other items. It may be desirable for a system to allow authorized release of the security tag, while making unauthorized release relatively difficult. Consequently, there may be a need for improved techniques in security tags and removal of security tags in general.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes an apparatus and for unlocking a security tag that is connected to an article. The apparatus includes an unlocking device configured to provide an unlock signal or force to a security tag allowing for the security tag to be removed from the article. The apparatus further includes an unlocking surface disposed between the unlocking device and the security tag and an alignment feature configured to indicate a detachment zone that corresponds with a source of the unlock signal, wherein placing the tag in the detachment allows for the unlocking device to provide an unlock signal or force to the security device to allow the security tag to be removed from the article.

Another example implementation includes a method for removing a security tag from an article. The method includes using an unlocking device configured to provide an unlock signal or force to a security tag allowing for the security tag to be removed from the article, wherein an unlocking surface is disposed between the unlocking device and the security tag. The method further includes placing the security tag on an alignment feature configured to indicate a detachment zone that corresponds with a source of the unlock signal or force, wherein placing the tag in the detachment allows for the unlocking device to provide an unlock signal or force to the security device to allow the security tag to be removed from the article.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features believed to be characteristic of aspects of the disclosure are set forth in the appended claims. In the description that follows, like parts are marked throughout the specification and drawings with the same numerals. The drawing figures are not necessarily drawn to scale and certain figures may be shown in exaggerated or generalized form in the interest of clarity and conciseness. The disclosure itself, however, as well as a preferred mode of use and further advantages thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting. Further, it will be obvious to one skilled in the art that the present invention may be practiced without these specific details.

For purposes of the disclosure, directional terms are expressed generally with relation to a standard frame of reference when the system and apparatus described herein is installed and in an in-use orientation.

Throughout the disclosure, the term substantially may be used as a modifier for a geometric relationship between elements or for the shape of an element or component. While the term substantially is not limited to a specific variation and may cover any variation that is understood by one of ordinary skill in the art to be an acceptable variation, some examples are provided as follows. In one example, the term substantially may include a variation of less than 10% of the dimension of the object or component. In another example, the term substantially may include a variation of less than 5% of the object or component. If substantially is used to define the angular relationship of one element to another element, one non-limiting example of the term substantially may include a variation of 5 degrees or less. These examples are not intended to be limiting and may be increased or decreased based on the understanding of acceptable limits to one of skill in the relevant art.

The following is a broad overview provided to add context to aspects and example advantages of aspects of the disclosure. It is noted that the examples provided in this overview are not intended to be limiting and are provided for ease of understanding of the disclosure.

Aspects of the present disclosure relate to a detacher system for removal of security tags and usable with an Electronic Article Surveillance ("EAS") system. An EAS system in a retail setting may include a monitoring system and at least one security tag or marker attached to an article to be protected from unauthorized removal of the article. It is noted that the terms article, merchandise, and item may be used interchangeably. The monitoring system establishes a surveillance zone in which the presence of security tags and/or markers can be detected. The surveillance zone may for example be established at access points (e.g., entrances and exits) of a controlled area. If an article passes through or enters the surveillance zone with an active security tag and/or marker, then an alarm may be triggered to indicate possible unauthorized removal from the controlled area. Thus, an EAS system may for example prevent, indicate, and/or track theft of articles from the controlled area. On the other hand, if an article is authorized for removal from the controlled area, for example when the article is purchased by a customer in a retail store, then the security tag or marker may be detached from the article and/or deactivated allowing for the article to be passed through the store exit without being detected by the monitoring system and/or without triggering an alarm.

Radio Frequency Identification ("RFID") systems may also be used in a retail setting for inventory management or security related applications. In an RFID system, a reader transmits a Radio Frequency ("RF") signal to an RFID device. The RFID device responds to the carrier signal with a data signal encoded with information stored by the RFID device. Passive RFID labels and/or detachable security tags that are either sewn into or otherwise connected to, or detachably connected to retail articles are frequently used in combination with EAS systems in retail applications.

Security tags for security and/or inventory systems may be constructed in a number of configurations. The desired configuration of a security tag is often dictated by the nature of the article to be protected. For example, security tags and/or RFID labels may be closed in a rigid tag housing, which can be secured to the monitored object (e.g., a piece of clothing in a retail store). The rigid housing typically includes a removable pin or tack, which may be inserted though the fabric and placed on the opposite side by a mechanism disposed within the security tag housing. The housing cannot be easily removed from the clothing without destroying the housing and/or the article except by using a dedicated removal device. Attachment devices for EAS security tags include a wide variety of different latching mechanisms designed to prevent unauthorized personnel from removing and/or retracting the pin from the tag. The stimulus needed to unlatch an EAS security tag depends upon the particular latching mechanism in use. Accordingly, a variety of different detaching units utilize various means to separate reusable, removable EAS security tags from articles of merchandise. Systems for unlatching EAS security tags include devices which may involve the application of a force to certain latching components of the EAS security tag. It is noted that the terms EAS security tag, security tag, and security label may be used interchangeably throughout the disclosure. The force can be applied directly to latching components via a mechanical element (e.g. a probe or hook inserted into the tag) unlatching the tag and/or indirectly via a magnet, for example. Regardless of how the force is applied, the result is a disengagement of a latching element that was previously engaged with an attachment pin in the tag, thereby allowing the tag to be removed from the article. One example of a security tag usable with the current disclosure is described with respect to FIGS. 3a and 3b below.

A retail sales transaction may occur at a Point of Sale ("POS") station manned by a store sales associate. The store sales associate may assist the customer with the checkout process by receiving payment for an item. If the item includes an EAS element such as a security tag or label, the store associate would use a dedicated removal device and/or a deactivation device to remove the security tag from the purchased item—or in the case of an affixed label or other RFID device, to deactivate the label or RFID device. However, after the completion of the purchase, the security tags may require manual removal, which may be time-consuming and/or prone to error. In such an example, improved efficiency of detachment device is desired.

Aspects of the current disclosure are related to a detacher that has an outer housing that assists with orienting a security tag with relation to the detachment zone or detachment area of a detaching device. The outer housing provides the advantage of allowing an associate to more efficiently remove the security tag from the article, for example while multitasking or removing security tags from a large number of articles during the checkout process. Thus, the current disclosure provides several advantages related to efficiency of the checkout process.

Further, the current disclosure is applicable to EAS systems usable with a mobile Point of Sale transaction (mPOS), system. In an mPOS system, customers may use their own mobile devices to complete Point of Sale transactions. If security tags are used in an mPOS system, the current disclosure allows for a user to safely and efficiently detach a security tag from an article after purchase while minimizing assistance needed from sales associates. Known detachers often are difficult to operate, especially for inexperienced users. Magnetic detachers, such as described in Commonly Assigned U.S. Pat. No. 8,054,185 titled "Optimization of a Field Profile on a High Field Strength Magnetic Detacher," issued on Nov. 8, 2011, which is incorporated by reference herein, provide advantages in efficient removal of tags. However, the current disclosure relates to a magnetic detacher that includes an outer housing or other aspects that assist with the orienting of a security tag with relation to a detachment zone or detachment area of the detaching device and for providing visual and/or other indication, such as an audible or vibration indication that that a security tag is authorized to be removed from the article.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Further, in some cases, methods, procedures, and components that are well-known or methods that would have been understood by one of skill in the art are described generally and without specific so as to not unnecessarily obscure aspects of the present disclosure.

Figure 1:
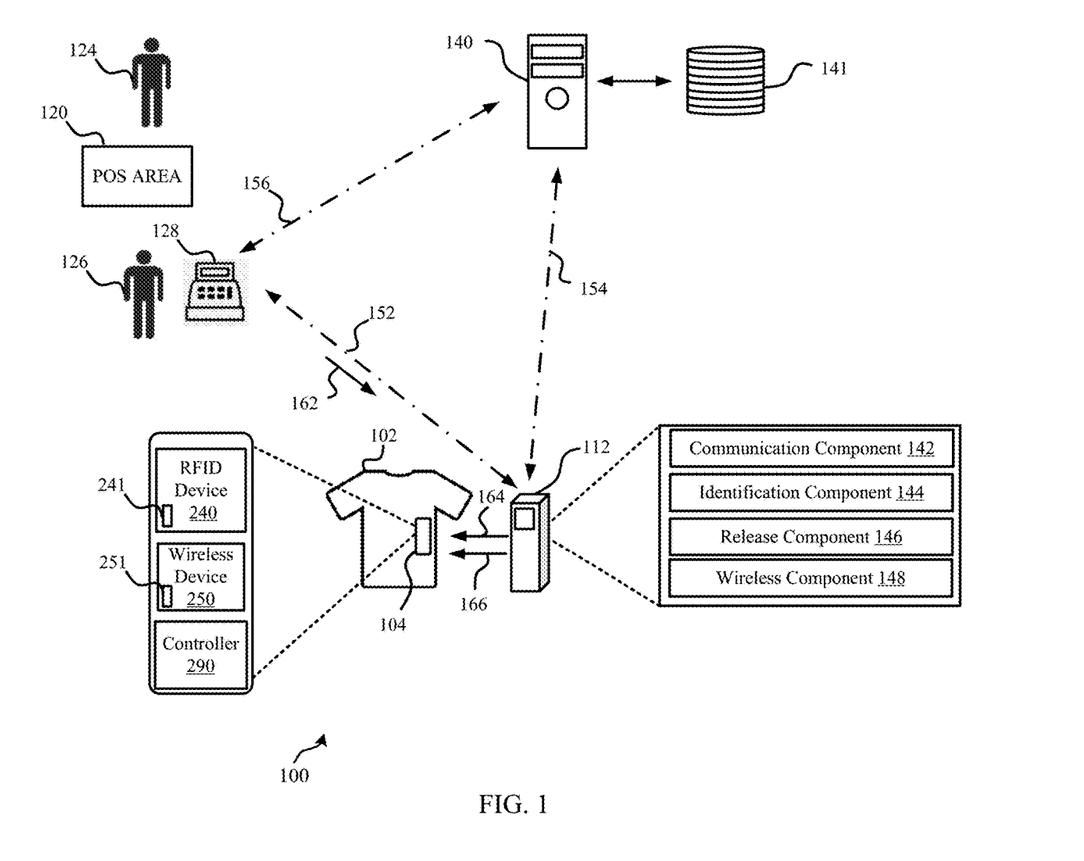
FIG. 1 illustrates an example of an environment for implementing a security tag removal process in accordance with aspects of the present disclosure.
Figure 2:
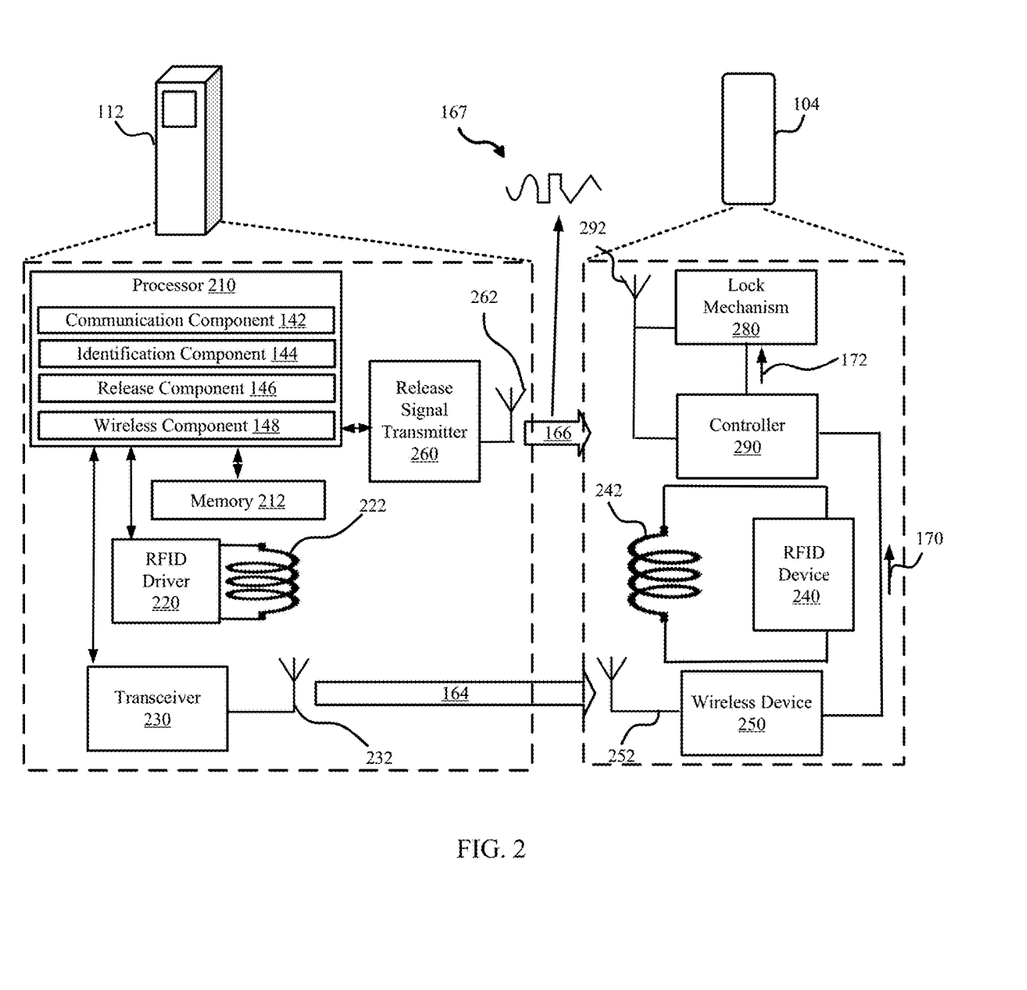
FIG. 2 illustrates an example of a radio frequency identification (RFID) scanner and a security tag in accordance with aspects of the present disclosure.

One non-limiting example of an EAS system usable with the current disclosure that is provided for context is described with respect to FIGS. 1 and 2. As shown in FIG. 1, an example of an environment 100 (e.g., a retail store) for loss prevention according to aspects of the present disclosure is shown. The environment may include a merchandise 102 having a security tag 104 attached to the merchandise 102. The security tag 104 may be locked (e.g., unable to be removed from the merchandise 102 without damaging the merchandise 102) to prevent unauthorized removal from the merchandise 102. The security tag 104 may include a RFID device 240 configured to transmit and/or receive RFID signals. The security tag 104 may include a wireless device 250 configured to transmit and/or receive wireless signals (e.g., Bluetooth, Wi-Fi, NFC, etc.). The RFID device 240 may include a RFID device identifier 241. The wireless device 250 may include a wireless device identifier 251. The security tag 104 may include a controller 290.

In certain implementations, the environment 100 may include a cash register 128 operating in a point-of-sale (POS) area 120. The cash register 128 may complete a sale associated with the merchandise 102. The cash register 128 may transmit a signal to a server 140 indicating the completion of the sale associated with the merchandise 102.

In some implementations, the environment 100 may include the server 140 and an optional data repository 141. The server 140 may communicate with the RFID scanner 112 and/or the cash register 128 via communication links 154, 156. The communication links 154, 156 may be wired or wireless communication channels.

In one aspect of the present disclosure, the environment 100 may include a RFID scanner 112 configured to transmit and/or receive RFID signals. The RFID scanner 112 may include a communication component 142 configured to communicate with the server 140 via the communication link 154 and/or the cash register 128 via the communication link 152. The RFID scanner 112 may include an identification component 144 configured to identify a wireless device 250 associated with a RFID device 240. The RFID scanner 112 may include a release component 146 that transmits and/or receives release signals to the security tag 104. It is noted that the terms RFID scanner and detacher may be used interchangeably throughout the disclosure. The RFID scanner 112 may include a wireless component 148 that transmits and/or receives wireless signals to and/or from the wireless device 250 of the security tag 104. One or more of the communication component 142, the identification component 144, the release component 146, and/or the wireless component 148 may be configured as hardware (e.g., application specific integrated circuit, application processors, field programmable gate arrays, etc.), software (e.g., instructions stored in a memory 212 executed by a processor of the RFID scanner 112), or a combination thereof. The controller 290 may be configured to transmit unlocking signals and/or receive releasing signals used to unlock the security tag 104. For example, the unlocking signal may result in the energizing of a switch or coil that unlocks or otherwise releases the security tag. In another example, release signal transmitter 260 may for example provide a magnetic force that unlocks or otherwise releases the lock mechanism 280 of security tag 104.

During operation, prior to a retail transaction, the RFID device 240 of the security tag 104 may be associated with the wireless device 250 of the security tag. In an implementation, the RFID device identifier 241 may be associated with the wireless device identifier 251. For example, a RFID hardware address of the RFID device 240 or a portion of the RFID hardware address may be associated with a wireless hardware address of the wireless device 250 or a portion of the wireless hardware address. In another implementation, a serial number or a portion of the serial number of the RFID device 240 may be associated with a serial number or a portion of the serial number of the wireless device 250. The association may be stored in the server 140 and/or the optional data repository 141. The RFID hardware address may be stored in the RFID device 240 (or a memory in the RFID device 240). The wireless hardware address may be stored in the wireless device 250 (or a memory in the wireless device 250). The serial numbers of the RFID device 240 and/or the wireless device 250 may be displayed on the security tag 104. The hardware addresses and/or serial numbers may be alphanumeric strings. In alternative examples, the server 140 may perform a mathematic function (e.g., hash function) to the RFID device identifier 241 and/or the wireless device identifier 251, and associate the results.

In alternative implementations, the RFID device identifier 241 may be associated with a release signal 166. For example, the release signal 166 may include a particular waveform. The RFID device identifier 241 may be associated with the release signal 166. The controller 290 may only unlock the security tag 104 in response to receiving the release signal 166 from the RFID scanner 112. Other signals transmitted to the controller 290 may not unlock the security tag 104.

In an implementation, the security tag 104 may be attached to the merchandise 102. The attachment may include a lock mechanism (described below) that prevents unauthorized detachment of the security tag 104 from the merchandise 102. The security tag 104 may prevent and/or deter unauthorized removal of the merchandise 102 from the environment 100.

The detacher system may have a detachment zone and/or limited area or region that allows for selective detachment of a security tag that is connected to an article. The detacher provides tactile and/or visual indication of a location of a detachment zone or "sweet spot" of the detacher. Further explanation of the detachment zone is described in further detail below with respect to FIGS. 4-7.

In some implementations, a customer 124 may attempt to purchase the merchandise 102. The merchandise 102 may be attached to the security tag 104. For example, the cash register 128 may receive price identification information (e.g., bar code scanned by the cash register 128 or price tag input by the clerk 126 and/or the customer 124) associated with the merchandise 102. In response, the cash register 128 may present a price of the merchandise 102 to the customer 124. The cash register 128 may receive payment (e.g., credit card, cash, or check) from the customer 124.

In certain implementations, after a purchase or authorization is provided for removal of a security tag, the RFID scanner 112 may transmit an interrogating signal to the RFID device 240. In response, the RFID scanner 112 may receive a response signal including the RFID device identifier 241 (e.g., the RFID hardware address or the RFID serial number). The RFID scanner 112 may transmit the RFID device identifier 241 to the cash register 128 via the communication link 152. In response to receiving the RFID device identifier 241, the cash register 128 may associate the sale of the merchandise 102 with the RFID device identifier 241.

In some variations, the cash register may transmit a confirmation signal 162 to the RFID scanner 112. The RFID scanner 112 may receive the confirmation signal 162 from the cash register 128 via the communication link 152 and/or from the server via the communication link 156. The confirmation signal 162 may include some or all of the following information: merchandise information of the merchandise 102, the RFID device identifier 241, an indication to unlock the security tag 104 from the merchandise, etc.

In a non-limiting implementation, the RFID scanner 112 may identify the wireless device 250 associated with the RFID device 240 based on the RFID device identifier 241. For example, the RFID scanner 112 may transmit the RFID device identifier 241 to the server 140 via the communication link 154. The server 140 may retrieve the association between the RFID device 240 and the wireless device 250, via the RFID device identifier 241, and transmit the wireless device identifier 251 to the RFID scanner 112. In another example, RFID scanner 112 may locally store (in a memory) the association between the RFID device 240 and the wireless device 250. The RFID scanner 112 may retrieve the wireless device identifier 251 from the memory.

In one aspect of the present disclosure, the RFID scanner 112 may transmit a wireless signal 164 to the wireless device 250 of the security tag 104 based on the RFID device identifier 241 and/or the retrieved wireless device identifier 251. The wireless signal 164 may indicate to the wireless device 250 to enable a controller 290 to receive a subsequently and/or concurrently transmitted release signal 168 used to unlock the security tag 104 from the merchandise 102. The wireless signal 164 may be encrypted. For example, the wireless signal 164 may be encrypted with symmetric or asymmetric encryption. The wireless signal 164 may be encrypted with advanced encryption standard (AES) algorithm, data encryption standard (DES) algorithm, MD5 encryption algorithm, or other suitable encryption algorithms.

In some aspects, an unlock or release signal transmitter 260 may transmit a release signal 166 to the security tag 104 to unlock the security tag 104 from the merchandise 102. The release signal 166 may be a low frequency signal (e.g., below 1 megahertz). The energy in the release signal 166 may be utilized by the security tag 104 for the unlock operation. The release signal 166 may be encrypted. For example, the release signal 166 may be encrypted with symmetric or asymmetric encryption. The release signal 166 may be encrypted with advanced encryption standard (AES) algorithm, data encryption standard (DES) algorithm, MD5 encryption algorithm, or other suitable encryption algorithms.

Referring to FIGS. 1 and 2, an example of the RFID scanner 112 may be configured to transmit the wireless signal 164 and/or the release signal 166 to the security tag 104. The RFID scanner 112 may include a processor 210 that executes instructions stored in a memory 212 for performing the unlocking functions described herein.

In some implementations, the RFID scanner 112 may include the memory 212. The RFID scanner 112 may include a RFID driver 220 configured to transmit and/or receive RFID signals via a scanner coil 222. The RFID scanner 112 may include a transceiver 230 configured to transmit and/or receive wireless signals via a scanner antenna 232. The RFID scanner 112 may include a release signal transmitter 260 configured to transmit the release signal 166 via a release signal antenna 262.

The processor 210 may cause the RFID driver 220 to transmit RFID signals, via a scanner coil 222, to the security tag 104. The RFID driver 220 may energize the scanner coil 222 to transmit the release signal 166. The scanner coil 222 may include one or more inductors that transmit or receive electromagnetic signals. The processor 210 may include the release component 146 that causes the release signal transmitter 260 to transmit the release signal 166, via the release signal antenna 262, to the security tag 104. The processor 210 may include the wireless component 148 that causes the transceiver 230 to transmit wireless signals via the scanner antenna 232.

Additionally, in some non-limiting examples, the security tag 104 may include the RFID device 240 that transmits and/or receives RFID signals via a tag coil 242. The security tag 104 may include the wireless device 250 that transmits and/or receives wireless signals via a tag antenna 252. The security tag 104 may include a lock mechanism 280 that securely fastens the security tag 104 to the merchandise 102.

During operation, in some implementations, the processor 210, the memory 212, the wireless component 148, the transceiver 230, and/or the scanner antenna 232 may receive the confirmation signal 162 from the cash register 128 and/or the server 140. The confirmation signal 162 may include an indication to unlock the security tag 104 to detach from the merchandise 102. The confirmation signal 162 may include the RFID device identifier 241. Alternatively or additionally, after receiving the confirmation signal 162, the RFID driver 220 may transmit an interrogating signal to the RFID device 240 to receive a response signal including the RFID device identifier 241.

In some instances, in response to receiving the confirmation signal 162, the processor 210, the memory 212, the identification component 144, the wireless component 148, the transceiver 230, and/or the scanner antenna 232 may identify the wireless device 250 associated with the RFID device 240. In one implementation, the processor 210, the memory 212, the wireless component 148, the transceiver 230, and the scanner antenna 232 may transmit a request to the server 140 via the communication link 154. The request may include the RFID device identifier 241. The server 140 may identify the wireless device identifier 251 associated with the RFID device identifier 241. In response, the server 140 may transmit a response to the RFID scanner 112 including the wireless device identifier 251 associated with wireless device 250. The RFID scanner 112 may identify the wireless device 250 based on the wireless device identifier 251. In another implementation, the memory 212 of the RFID scanner 112 may store the association between the RFID device identifier 241 and the wireless device identifier 251. The processor 210 and the memory 212 may identify the wireless device identifier 251 stored in the memory 212 based on the RFID device identifier 241. The RFID scanner 112 may identify the wireless device 250 based on the wireless device identifier 251. Other methods of identifying the wireless device 250 may be used.

In an implementation, the processor 210, the memory 212, the wireless component 148, the transceiver 230, and/or the scanner antenna 232 may transmit the wireless signal 164 to the tag antenna 252 of the security tag 104. In response to receiving the wireless signal 164, the wireless device 250 may transmit an enablement signal 170 to enable the controller 290 and/or the lock mechanism 280 to receive the release signal 166 to unlock the lock mechanism 280.

In some implementations, the processor 210, the memory 212, the release component 146, and/or the release signal antenna 262 may transmit the release signal 166 to the lock antenna 292 of the security tag 104. In response to receiving the wireless signal 164 prior to receiving the release signal 166, the controller 290 may transmit an unlocking signal 172 to the lock mechanism 280. The controller 290 may utilize the electrical energy in the release signal 166 to generate the unlocking signal 172. In certain implementations, the release signal 166 may be a direct current signal or an alternative current signal. The controller 290 may be configured as one or more microprocessors, controllers, digital signal processors (DSPs), field programmable gate arrays (FPGAs), programmable logic devices (PLDs), state machines, gated logic, discrete hardware circuits, and other suitable hardware.

In some implementations, the controller 290 may be unable to receive the release signal 166 without receiving the wireless signal 164 beforehand. In other implementations, the controller 290 may be able to receive the release signal 166 without receiving the wireless signal 164, but unable to transmit the unlocking signal 172 without receiving the wireless signal 164 beforehand.

In alternative implementations, the controller 290 may receive release signal 166 only if a waveform 167 of the release signal 166 is substantially identical to a predetermined waveform. In such instances, the processor 210, the memory 212, the release component 146, and/or the release signal antenna 262 may transmit the release signal 166 with the waveform 167 (e.g., amplitude pattern, frequency pattern, phase pattern, modulation, encoding, encryption, etc.). The controller 290 may determine that the waveform 167 of the release signal 166 is substantially identical to the pre-determine waveform. As a result, the controller 290 may transmit the unlocking signal 172 to the lock mechanism 280 for unlocking.

Figure 3A:
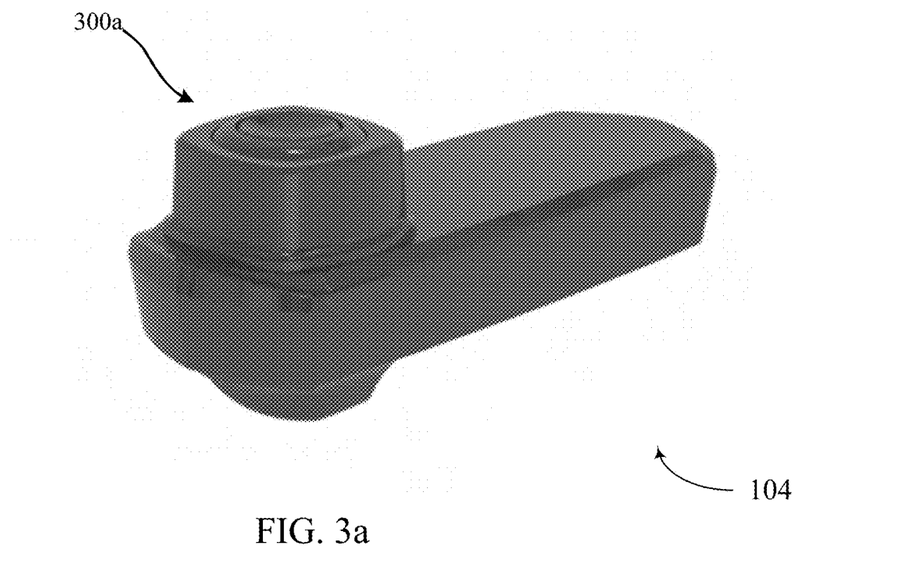
FIG. 3a illustrates an example of a security tag in a locked position in accordance with aspects of the present disclosure.
Figure 3B:
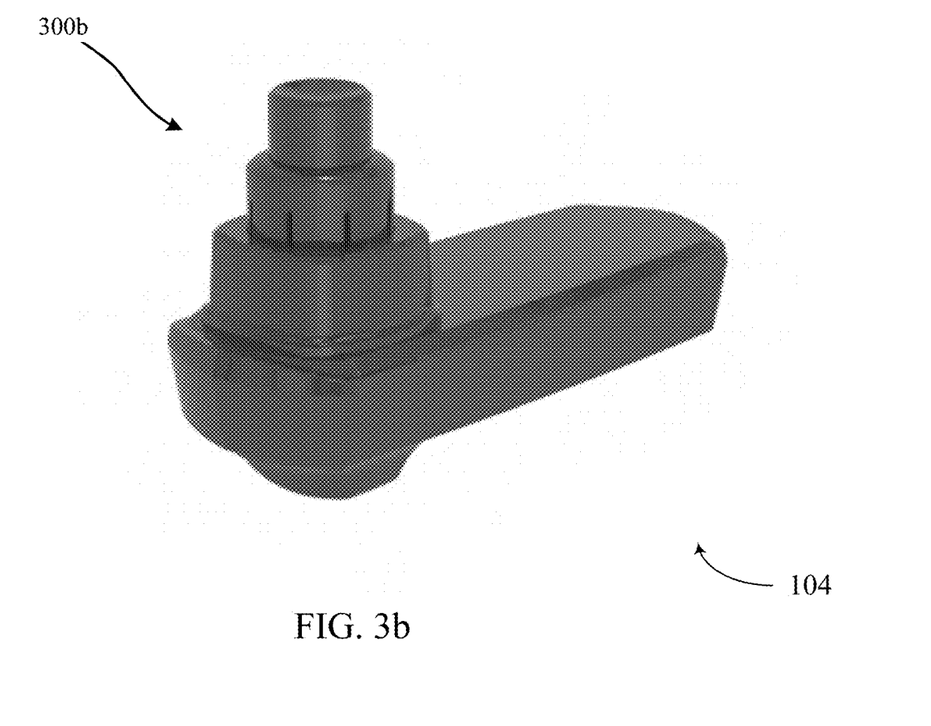
FIG. 3b illustrates an example of a security tag in an unlocked position in accordance with aspects of the present disclosure.

Referring to FIGS. 3a and 3b, an example of the security tag 104 described herein may transition from a locked position 300a to an unlocked position 300b in response to being placed on a detachment zone of a detaching device (e.g., RFID scanner 112 described above). In one example, the detachment zone may for example be within or in the proximity of any one or a combination of a magnetized region, a detachment coil, and/or electromagnetic coil of the detaching device 312 (FIGS. 4-7) that allows for authorized detachment of a security tag (e.g., tag 104) from an article (e.g., article 102) when the tag is placed in the detachment zone. In one example, a magnetic force may be applied to the tag 104 which causes the security tag to transition from the locked position 300a to the unlocked position 300b in response to receiving the RFID signal at the RFID device to unlock the security tag. For example, the security tag 104 may receive a wireless signal 164 to enable the RFID device 240 to receive the release signal 166. In response to the release signal 166, the security tag 104 may transition from the locked position 300a to the unlocked position 300b. As mentioned above, one example of a release signal 166 is a magnetic force provided by any one or a combination of a magnet, electromagnet, and/or coil. One example of a position of a release coil within the housing of detacher 400 is indicated as reference 430 in FIG. 6.

Figure 4:
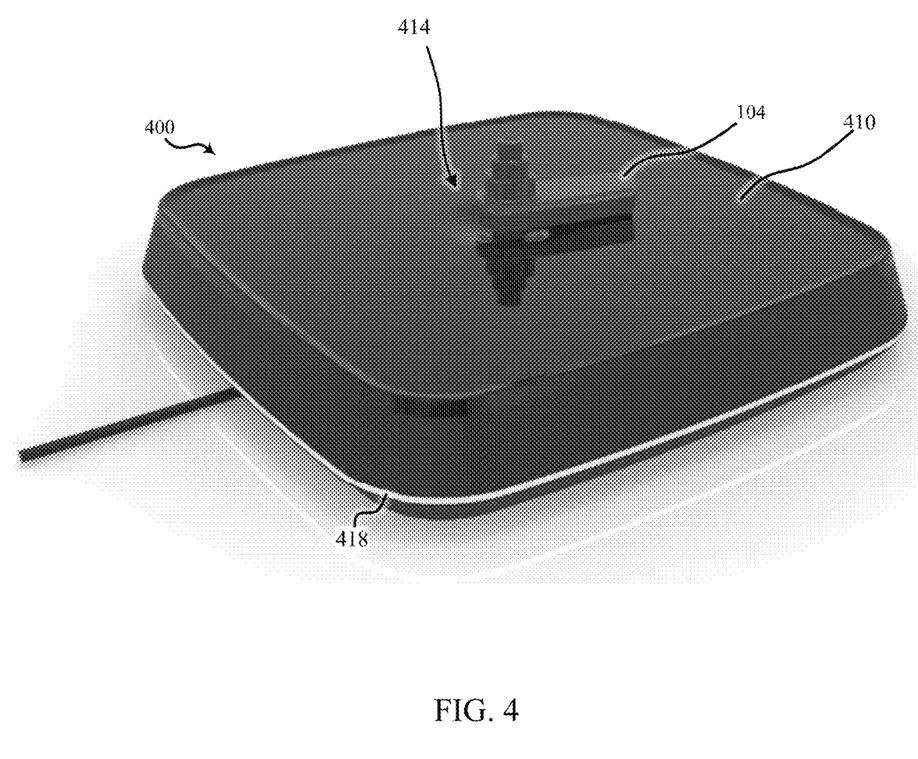
FIG. 4 illustrates an example of a RFID scanner and/or detacher in accordance with aspects of the present disclosure.
Figure 5:
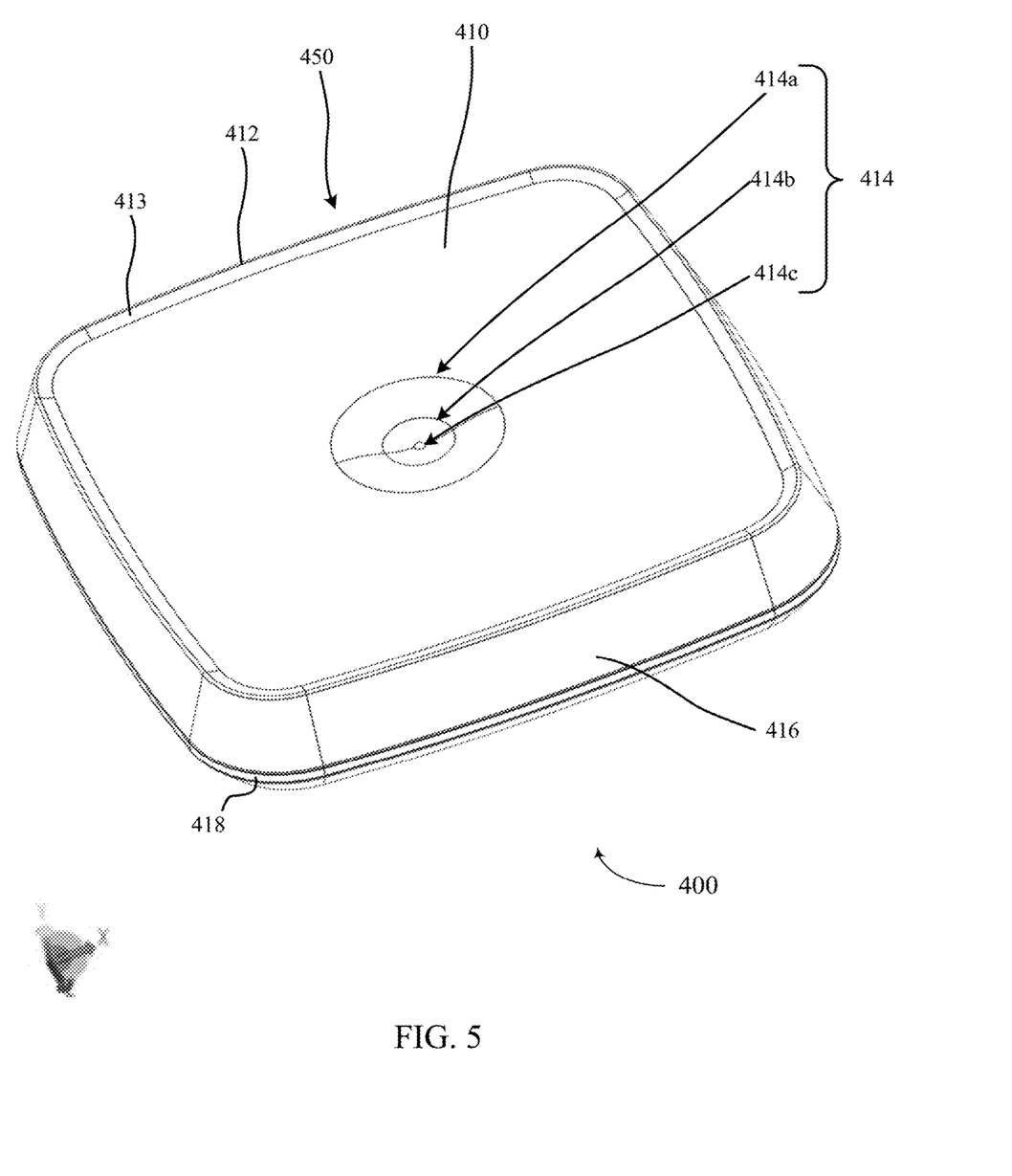
FIG. 5 is a top perspective view of a detacher according to the described aspects of the present disclosure.
Figure 6:
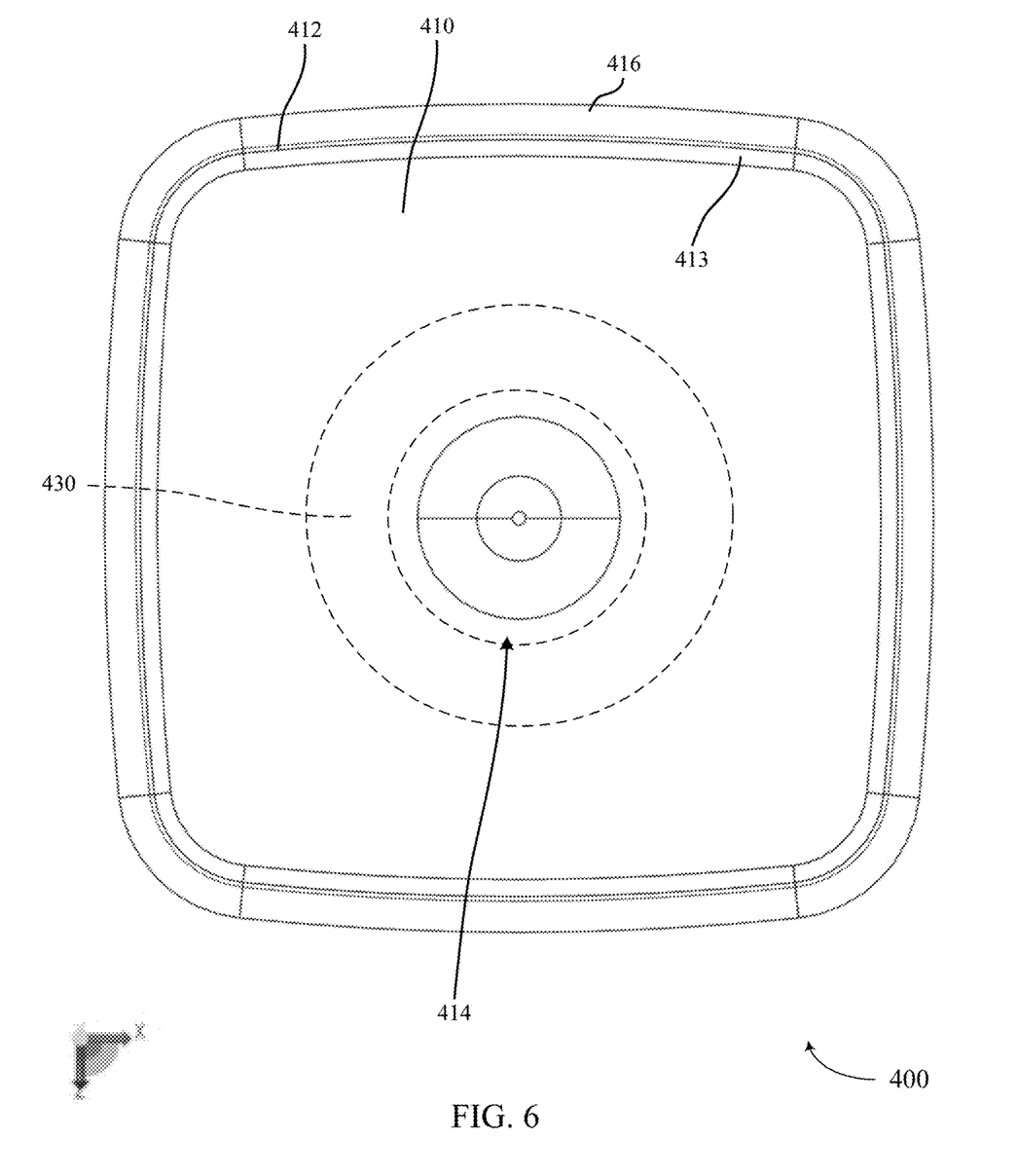
FIG. 6 is a top view of the detacher of FIG. 5 according to the described aspects of the present disclosure.

It is noted that the term detachment or detachment zone, as used throughout the disclosure, is not limited to merely the force/signal and location on the detacher and/or RFID scanner that provides the detachment force/signal but may also include an identifier (e.g., identification component 144) or any component associated with either identification and or releasing of a security tag. With reference to FIG. 4, in one example, the detachment zone 414 may be an area of the detacher or scanner 400, which may for example be scanner 112 discussed above, that provides signal communication associated with any of the aforementioned aspects. In one example, the detachment zone 414 may for example be part of a larger area or surface 410 (FIGS. 4-6). Throughout the disclosure the term detachment zone and alignment feature may be used interchangeably. In the aforementioned example, only placement of the tag 104 in the detachment zone 414 allows for release of the tag and placement of the tag 104 on the larger area or surface 410 does not allow for release of the tag 104 (e.g., transition from a locked position 300a to the unlocked position 300b). The aforementioned example may prevent accidental or unintended detachment of the tag 104 from an article (for example if multiple tags are being removed by a user from multiple articles).

FIG. 4 shows one example of a RFID scanner and/or detacher 400 in accordance with one aspect of the disclosure. In the example shown in FIG. 4, the tag 104 described with respect to FIGS. 3a and 3b may be placed in in a detachment zone 414 of the detacher 400. The detachment zone 414 may be a section of a detachment surface or surrounding surface 410 that is disposed between the unlocking device and the security tag 104. Once the tag is 104 is authorized for removal, a release signal and/or force (e.g., magnetic force) is provided to the tag 104 via an unlocking device within the detacher 400 to cause the tag to transition from the locked position (e.g., position 300a shown in FIG. 3a) to the unlocked position (e.g., position 300b shown in FIG. 3b). As shown in FIGS. 4-6, the detachment zone 414 may be a concave portion of detacher 400. The concave surface demarcating the detachment zone 414 may for example be indented or otherwise curved downward with respect to a larger surrounding surface 410. In one example, the surrounding surface 410 may be substantially flat with the detachment zone 414 curving downward or concavely therefrom. In one example, as indicated in FIG. 4, the detachment zone 414 may for example include a first region 414a, a second region 414b and a third region 414c (FIG. 5). In one example the third region 414c may for example form a divot or other protrusion that extends upward from a lowermost surface of the second region 414b. In one example, the detachment zone may extend downward (e.g., in the negative Y direction as indicated in FIG. 5) from the surrounding surface 410 a distance between 0.3 inches and 0.75 inches, or between 0.4 inches and 0.65, or preferably approximately 0.5 inches. In one example, the diameter of the detachment zone may be between 1 inches and 2 inches. In another example, the diameter of the detachment zone 414 may be between 1.25 inches and 1.75 inches or preferably approximately 1.5 inches. As shown in FIG. 6, the detachment zone 414 may for example be within a release device (e.g., a release coil or electromagnetic coil) 430 that is located within the detacher 400. In the aforementioned example, the detachment zone 414 and/or detachment zone surrounding surface 410 may for example be molded or otherwise formed as a single component with a lid of the detacher. The lid of the detacher may additionally include four sides (e.g., side 416), an inner rim 413 surrounding the detachment zone surrounding surface and a rim edge 412. The combination of the features of the lid may provide aesthetic qualities as well as further guide a user or associate to the detachment zone 414. In one example, the surrounding surface 410 may angle downward towards the detachment zone 414.

In one example, the detacher shown in FIGS. 4-7 may for example have similar major dimensions in an X direction and a Z direction as indicated in FIG. 6. The major outer dimension of the detacher may range between 6 inches and 15 inches. In another example the detacher 400 may have outer dimensions that range between 8 inches and 13 inches and preferably approximately 10 inches by 10 inches. It is further noted that the detachment zone 414 may be implemented into an overall larger structure. For example, the surrounding surface 410, may for example, be part of a counter or tabletop with a single or multiple detachment zones 414. In addition, the detacher 400 and/or surface 410 and/or detachment zone 414 may take on any shape that is practical for implementation into a retail or other environment.

While not limited to a specific material, the lid and/or outer housing 450 of the detachment device may be formed of a polycarbonate or Acrylonitrile butadiene styrene (ABS) plastic. Other examples of materials that may be used to form the detachment zone 414, surrounding surface 410 and/or the entire lid (e.g., sides 416, rim 412 and inner rim 413) include plastics and other synthetic materials, natural materials such as wood, plant fibers, and/or compressed felt to name a few additional examples.

The aforementioned detachment zone 414 allows a user to tactually and/or visually locate a location in which a security tag can be transitioned from a locked to an unlocked position while proving an aesthetically pleasing device. In addition, because the aforementioned structure does not impede or otherwise obstruct the tag, and allows for three hundred and sixty degree alignment of the tag, the aforementioned aspects further improve efficiency of removal of security tags. Accordingly it is possible to maintain the securing of an EAS system while eliminating the majority of the hindrances related to ease of use associated with such a system.

As shown in FIGS. 4 and 5, the detacher 400 may further include an indication section such as an indicator light ring 418. The indicator light right 418 may for example light when a tag 104 is correctly placed and ready for removal from the article 102. In one example, the light 418 may for example be configured to light up in a specific color (e.g., green) when the tag is ready to be removed from an article. In addition, the light 418 may be configured to vary light duration and/or color depending on the status of the detacher. For example, if the tag is not removable either because a user has not properly paid for the item associated with the tag, and/or because the tag is incorrectly placed or oriented on the detacher 400, the light may change to a second color different from the first color (e.g., red) and/or may change in duration (e.g., may start blinking). It is noted that the aforementioned indicator is not limited to the light ring 418 shown in FIG. 5. With the benefit of this disclosure, any single light, series of lights, and/or location may be used to provide the aforementioned visual indicators. In one example, the light ring may for example surround the detachment zone 414. In another example, a series of lights in the detachment zone surrounding surface 410 may for example be configured to blink in a specific patter or otherwise indicate the location of the detachment zone 414. In one example, either usable with or instead of the aforementioned visual indication, the device may provide indication via other senses of a user. For example, the detacher may vibrate and/or provide audible indication to provide status of the device and/or the tag.

It is further noted that with the benefit of this disclosure, any additional or alternative tactile or visual indicators may be provided to tactually or visually indicate a location of a detachment zone. For example, the detachment zone may be a protrusion instead of a concave portion and/or a protrusion with a concave portion therein. In another example, the detachment zone may for example be indicated via a textural or visual difference between the detachment zone and a surrounding surface (e.g., ridges, polishing, color or other surface feature(s)).

Figure 7:
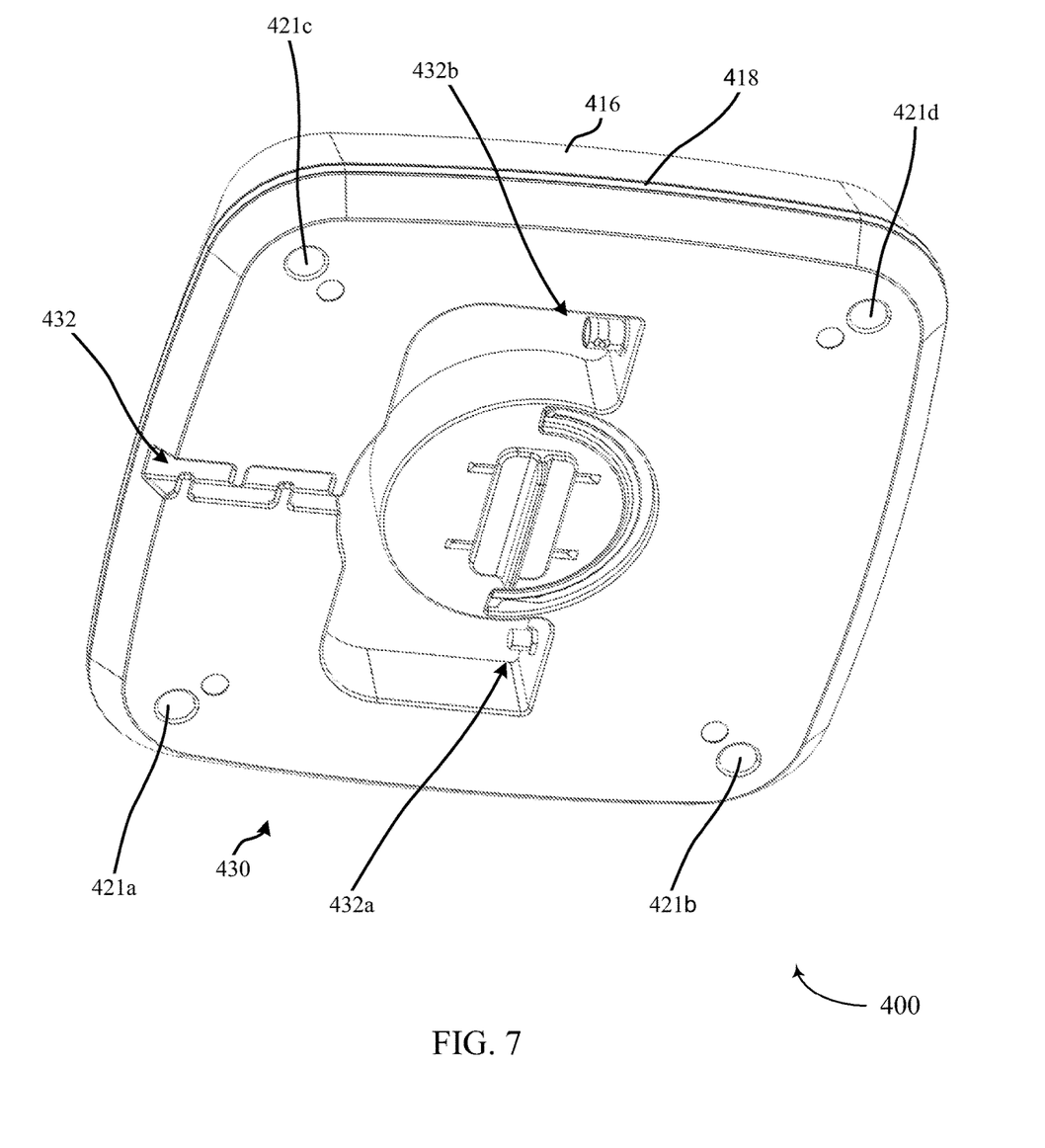
FIG. 7 is a bottom perspective view of the detacher in FIGS. 5 and 6 according to the described aspects of the present disclosure.

FIG. 7 shows examples of a bottom structure of the detacher 400 in accordance with an aspect of the disclosure. As shown, the detacher 400 may include a bottom housing 400 that includes a series of contact portions 421*a-d* configured to contact a surface for the detacher 400 to be placed thereon. In one example, the contact portions 421*a-d* may for example be rubberized feet that project below the surface of the bottom housing 430. The contact portions 421*a-d* may for example provide grip to prevent the detacher from a surface thereon. The bottom housing 430 may for example include a cable management portion 432 configured to captively contain a cable or series of cables that are connected to one or more connectors 432*b* and/or 432*c*. The cable(s) (not shown) that are connectable to connectors 432*a* and/or 432*b* may provide signal communication with an EAS system (e.g., a system as described with respect to FIGS. 1-2 above) and/or may provide electrical current to power the components within detacher 400.

The foregoing description of various aspects and examples have been presented for purposes of illustration and description. It is not intended to be exhaustive nor to limit the disclosure to the forms described. The embodiment(s) illustrated in the figures can, in some instances, be understood to be shown to scale for illustrative purposes. Numerous modifications are possible in light of the above teachings, including a combination of the abovementioned aspects. Some of those modifications have been discussed and others will be understood by those skilled in the art. It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims. The various aspects were chosen and described in order to best illustrate the principles of the present disclosure and various aspects as are suited to the particular use contemplated. The scope of the present disclosure is, of course, not limited to the examples or aspects set forth herein, but can be employed in any number of applications and equivalent devices by those of ordinary skill in the art. Rather, it is hereby intended the scope be defined by the claims appended hereto.

What is claimed is:

1. An apparatus for unlocking a security tag that is connected to an article, the apparatus comprising:
    an unlocking device configured to provide an unlock signal or force to the security tag allowing for the security tag to be removed from the article;
    an unlocking surface disposed between the unlocking device and the security tag;
    an alignment feature configured to indicate a detachment zone that corresponds with a source of the unlock signal or force, wherein placing the tag in the detachment zone allows for the unlocking device to provide the unlock signal or force to the security tag to allow the security tag to be removed from the article; and an indicator to show a status of the security tag placed in proximity of the unlocking surface, wherein the indicator comprises a light that surrounds the unlocking surface.

2. The apparatus of claim 1, wherein the alignment feature forms a continuous surface with the unlocking surface.

3. The apparatus of claim 2, wherein the alignment feature forms a concave surface with respect to the unlocking surface.

4. The apparatus of claim 3, wherein the unlocking surface is flat.

5. The apparatus of claim 4, wherein the alignment feature includes a protrusion within the concave surface.

6. The apparatus of claim 1, wherein the unlocking device provides a magnetic force to the security tag which allows the security tag to be removed from the article.

7. The apparatus of claim 1, wherein the apparatus is configured to provide the unlock signal or force to the tag when the tag is placed on the alignment feature, wherein the alignment feature is configured to unlock the tag without impeding movement of the tag with respect to the unlocking feature or the unlocking surface.

8. The apparatus of claim 1, wherein a color of light emitted from the indicator varies from a first color to a second color to indicate a change in the status of the security tag.

9. The apparatus of claim 1, wherein a duration of light emitted from the indicator varies from a first duration to a second duration to indicate a change in the status of the security tag.

10. The apparatus of claim 1, wherein a pattern of light emitted varies from a first pattern to a second pattern to indicate a change in the status of the security tag.

11. The apparatus of claim 1, wherein the light comprises a light ring around an outside of the apparatus.

12. The apparatus of claim 1, wherein the light comprises a light ring around the detachment zone.

13. The apparatus of claim 1, further comprising an audio device configured to generate an audio indication to indicate a change in the status of the security tag.

14. The apparatus of claim 1, further comprising a vibrating device configured to generate a vibration to indicate a change in the state of the security tag.

15. The apparatus of claim 1, further comprising a first textural feature different from a second textural feature to indicate the location of the detachment zone.

16. A method for unlocking a security tag that is connected to an article, the method comprising:

using an unlocking device configured to provide an unlock signal or force to the security tag allowing for the security tag to be removed from the article, wherein an unlocking surface is disposed between the unlocking device and the security tag;

placing the security tag on an alignment feature configured to indicate a detachment zone that corresponds with a source of the unlock signal or force, wherein placing the tag in the detachment zone allows for the unlocking device to provide the unlock signal or force to the security tag to allow the security tag to be removed from the article; and providing an indication to show a status of the security tag placed in proximity of the unlocking device, wherein the indication comprises illuminating a lighted portion that surrounds the unlocking surface.

17. The method of claim 16, wherein the alignment feature forms a continuous surface with the unlocking surface.

18. The method of claim 17, wherein the alignment feature is a concave surface in the unlocking device surface.

19. The method of claim 18, wherein the unlocking surface is flat.

20. The method of claim 19, wherein the alignment feature includes a protrusion within the concave surface.

21. The method of claim 16, wherein the unlocking device provides a magnetic force to the security tag which allows the security tag to be removed from the article.

22. The method of claim 16, wherein the unlocking device is configured to provide the unlock signal or force to the tag when the tag is placed on the alignment feature, wherein the alignment feature is configured to unlock the tag without impeding movement of the tag with respect to the unlocking feature or the unlocking surface.

* * * * *